(12) United States Patent
Kan et al.

(10) Patent No.: US 10,891,676 B1
(45) Date of Patent: Jan. 12, 2021

(54) USER INTERFACE FOR NAVIGATING RELATED ITEMS

(71) Applicant: Amazon Technologies, Inc., Seattle, WA (US)

(72) Inventors: Andrey Kan, Seattle, WA (US); Christos Faloutsos, Seattle, WA (US); Xin Luna Dong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 16/031,885

(22) Filed: Jul. 10, 2018

(51) Int. Cl.
*G06Q 30/00* (2012.01)
*G06Q 30/06* (2012.01)

(52) U.S. Cl.
CPC ..... *G06Q 30/0629* (2013.01); *G06Q 30/0631* (2013.01); *G06Q 30/0643* (2013.01)

(58) Field of Classification Search
CPC .................. G06Q 30/0601–0645; G06Q 30/80
USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 6,963,867 B2 | 11/2005 | Ford et al. | |
| 2014/0379528 A1* | 12/2014 | Martin | G06F 3/04817 705/26.62 |
| 2015/0142787 A1* | 5/2015 | Kimmerling | G06F 16/252 707/723 |
| 2016/0026720 A1* | 1/2016 | Lehrer | G06F 16/23 707/710 |
| 2017/0293695 A1* | 10/2017 | Brovman | G06Q 30/0631 |
| 2018/0174220 A1* | 6/2018 | Jadhav | G06Q 30/0631 |
| 2019/0251446 A1* | 8/2019 | Fang | G06N 3/084 |

OTHER PUBLICATIONS

Anonymous, "Alibaba Group Holding Limited; Patent Issued for Method and System of Displaying Cross-Website Information (USPTO 9734258)," Investment Weekly News, pp. 2002, 2017.*

* cited by examiner

*Primary Examiner* — Brandy A Zukanovich
(74) *Attorney, Agent, or Firm* — Knobbe, Martens, Olson & Bear, LLP

(57) ABSTRACT

An improved user interface in which related items are grouped intuitively, and ultimately results in the number of navigational steps performed by the user to identify desired related items being reduced, is described herein. For example, instead of having a user interface display a single view that includes all related items, a recommendation system groups the related items based on their respective attribute values and produces data that results in a user interface that displays the related items in these groups. The recommendation system generates labels for these groups such that a user can clearly identify what types of related items are included therein. Thus, a user would not have to browse through a single list of related items ordered in an unfamiliar manner. Rather, a user can browse through smaller subsets of related items, and only in those groups that correspond with attribute values of interest to the user.

17 Claims, 7 Drawing Sheets

USER INTERFACE FOR NAVIGATING RELATED ITEMS

BACKGROUND

Content pages (e.g., a web page, a network page transmitted and/or received over a network other than the Internet, etc.) are commonly generated dynamically in response to page requests from user devices, and are displayed in user interfaces. The content of the generated content page can vary based on various factors, such as attributes of the user device, a context of the current browsing session, actions performed by the user in prior browsing sessions, and/or the like. Ideally, the content selected to be included in a generated content page is of value for presenting to the user operating the user device. However, it can be difficult to identify and display the content in a manner that minimizes the number of user interactions with the content page and/or the number of content pages requested by the user as the user attempts to identify desired content.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
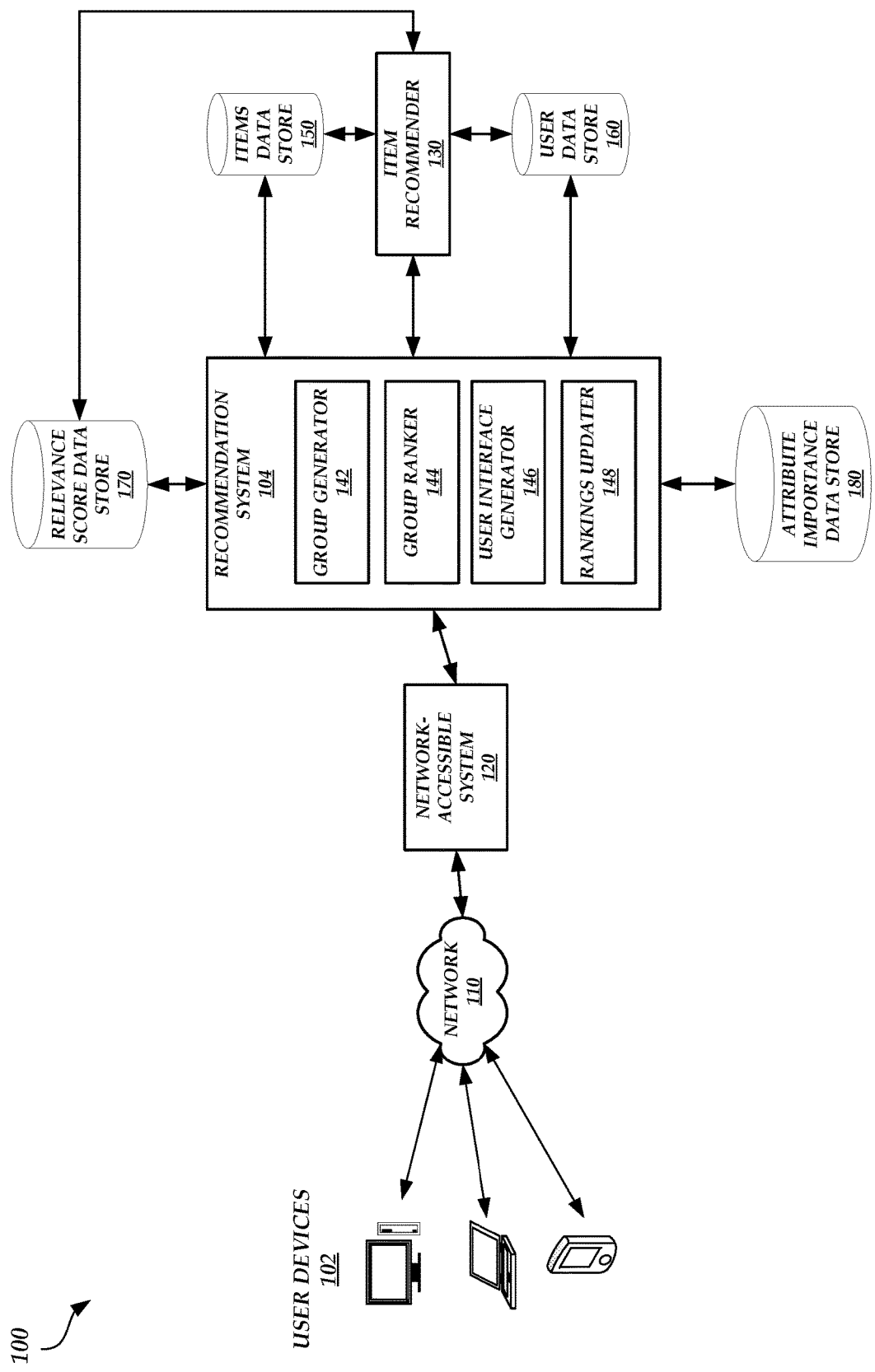
FIG. 1 is a block diagram of an illustrative operating environment in which a recommendation system uses related item data to generate groups of related items and data for causing user interfaces to display such groups, in one embodiment.

As described above, it can be difficult to identify and display the content in a manner that minimizes the number of user interactions with the content page and/or the number of content pages requested by the user as the user attempts to identify desired content. For example, when a user is viewing a first item in an electronic catalog (e.g., a seed item), conventional network-based systems (e.g., conventional recommendation systems) may display other, related items available in the electronic catalog. Because screen space may be limited, a few of the related items may initially be displayed in a single window or portion of the content page in a sequential order. The user may be able to view other related items that are not initially displayed by selecting arrow buttons, scrolling, and/or the like. This manner of displaying the related items may be referred to herein as a "carousel view."

In some cases, there may be a large number of related items (e.g., hundreds of related items) in the carousel view. Thus, a user may have to select the arrow buttons several times, scroll for a long period of time, etc. before arriving at a related item that may be of interest to the user. Thus, the number of navigational steps that a user may have to take to arrive at a desired related item can be high.

In addition, the network-based system may order the related items based on a likelihood that a user may select and/or obtain the related item (e.g., related items may be ordered based on a degree of relatedness to the seed item, where relatedness between two items may be measured based on, for example, how frequently the two items are purchased in combination or are viewed within the same browsing session). However, the manner in which the related items are ordered may not be apparent to a user. In fact, the order may make no logical sense to the user. For example, the seed item may have a first attribute, a second attribute, and a third attribute. The user may find the third attribute to be most important and therefore may be interested in related items that also have the third attribute. The network-based system, however, is not ordering the related items based on whether such items do or do not have the third attribute. Thus, there may be situations in which the first related item in the carousel view has the third attribute, the second, third, and fourth related items in the carousel view do not have the third attribute, the fifth related item has the third attribute, and so on. The user may be unsure of how many related items in the carousel view have the third attribute and therefore when to stop browsing through the carousel view. This can result in the user prematurely stopping a browse through the carousel view and missing related items that may be of interest to the user.

Accordingly, described herein is an improved user interface in which related items are organized in a manner that is intuitive to a user, and ultimately results in the number of navigational steps performed by the user to identify desired related items being reduced. For example, instead of having a user interface that displays a single carousel view that includes all related items, a recommendation system can group the related items based on their respective attribute values and produce data that results in a user interface that displays the related items in these groups. The recommendation system can generate labels for these groups such that a user can clearly identify what types of related items are included therein. Thus, a user would not have to browse through a single list of related items ordered in an unfamiliar manner. Rather, a user can browse through smaller subsets of the related items, and only in those groups that correspond with attribute values of interest to the user. Thus, a user interface that displays related items in groups generated by the recommendation system results in a more intuitive related item browsing process, thereby reducing the number of navigational steps performed to identify desired content.

In particular, as described above, the task of navigating a large electronic catalog of items (e.g., a catalog with over one thousand items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory, and/or by navigating a carousel view. Typically, however, the browse tree includes several levels of categories, requiring the user to navigate through several levels of browse nodes or category pages to arrive at the subcategory of interest and/or the carousel view includes a large number of items ordered in a sequential manner. Further, in many cases as described above, the items of interest are not accurately or intuitively categorized, requiring the user to perform additional navigation or keyword searching (e.g., additional page requests, additional scrolling, additional selecting of browsing arrow buttons, etc.). Thus, the user frequently has to perform numerous navigational steps to arrive at the catalog page or "item detail page" of interest.

Recommendation algorithms and user interfaces of the type disclosed herein significantly reduce this problem, allowing users to locate items of interest with fewer steps. For example, in the embodiments described herein, when the user is presented with a catalog page, items to be recommended to the user are organized in groups with labels that clearly identify the types of items that can be found in any one group. See, e.g., FIGS. 5A-5B, discussed below, which depicts an item detail page for a particular television, and which shows three labeled carousel display objects, 530-550, for exploring three respective groups of related items. Each item recommendation preferably includes, or is in the form of, a link to the catalog's item detail page for the corresponding item, allowing the user to navigate directly to this page. The user can then view fewer items (thereby requiring fewer navigational steps), and each recommendation thus serves as a programmatically selected navigational shortcut to the item's detail page or description (thereby allowing the user to bypass the navigational structure of the browse tree). Beneficially, programmatically identifying items of interest, grouping the items in an intuitive manner with labels that clearly identify common feature(s) of the grouped items, and presenting the user with navigational shortcuts to these items can improve the speed of the user's navigation through the electronic catalog, rather than requiring the user to page through multiple other pages to locate the recommended items via the browse tree, via searching, and/or via browsing through a carousel view. This can be particularly true for computing devices with small screens (e.g., smartphones), where fewer items can be displayed to the user at a time and thus navigation of larger volumes of items is more difficult.

The foregoing aspects and many of the attendant advantages of this disclosure, including the above-referenced technical benefits, will become more readily appreciated as the same become better understood by reference to the following detailed description, when taken in conjunction with the accompanying drawings.

Example Recommendation Environment

FIG. 1 is a block diagram of an illustrative operating environment 100 in which a recommendation system 104 uses related item data to generate groups of related items and data for causing user interfaces to display such groups, in one embodiment. The operating environment 100 includes the recommendation system 104, end user devices 102, a network-accessible system 120, an item recommender 130, an items data store 150, a user data store 160, a relevance score data store 170, and an attribute importance data store 180.

The item recommender 130 can be configured to access the items data store 150, the user data store 160, and/or the relevance score data store 170 to generate a list of items available in an electronic catalog that are related to a seed item (e.g., an item in an electronic catalog that a user is currently viewing, an item in an electronic catalog that a user will view in the future, etc.). For example, the item recommender 130 can receive, as an input, an identification of a seed item and/or an identity of a user and/or user device 102. The item recommender 130 can then query the items data store 150 to identify attributes of the seed item. The item recommender 130 can also query the user data store 160 to identify data associated with the user or user device 102, such as user interests, user hobbies, user age, user gender, user purchase history, user search history and/or current search queries, user subscriptions, actions performed by the user in prior browsing sessions, parts of a screen a user typically clicks while browsing, etc. Using some or all of this information, the item recommender 130 can query the items data store 150 (e.g., to determine attributes of various items) and/or the relevance score data store 170 (e.g., to determine relevance scores of the various items) to identify items to recommend to a user that has selected the seed item for viewing (where the items recommended by the item recommender 130 are also referred to herein as related items). The item recommender 130 can then output a list of related items. In some embodiments, the item recommender 130 is external to the recommendation system 104. In other embodiments, not shown, the item recommender 130 is internal to the recommendation system 104. Additional details of the process by which an item recommender 130 or other like system identifies related items (e.g., a personalized set of items available in an electronic catalog to recommend to a user based on user activity) is described in U.S. Pat. No. 7,685,074, titled "DATA MINING OF USER ACTIVITY DATA TO IDENTIFY RELATED ITEMS IN AN ELECTRONIC CATALOG" ("the '074 patent"), which is hereby incorporated by reference herein in its entirety. The related items identified by the item recommender 130 or other like system, can, but need not be, personalized to a particular user. Where no personalization is used, the recommendation system 104 can generate groups for a particular item periodically (e.g., once per day, once per week, etc.) and store information about such groups for subsequent look-up in response to a page request (e.g., rather than dynamically generate such groups in response to a page request).

The recommendation system 104 may include various modules, components, data stores, and/or the like to generate groups of related items, populate the groups with related items, and determine a group order such that the groups are displayed in the determined order in a user interface (e.g., in a content page displayed by a user device 102). For example, the recommendation system 104 includes a group generator 142, a group ranker 144, a user interface generator 146, and a rankings updater 148.

The group generator 142 can, for a particular seed item, generate one or more groups and labels for each group. Each group may be associated with an attribute of the seed item. Each attribute of the seed item may correspond to one or more groups. The group generator 142 may generate a label for a group using one of several label templates. A label template can include template text and a blank portion that the group generator 142 replaces with the name of an attribute. The group generator 142 can select a particular label template based on the value of an attribute. For example, the group generator 142 can obtain values of the attributes of a seed item from the items data store 150. If the value of an attribute is generic text, the group generator 142 can generate two groups for the attribute (e.g., labeled "different <attribute name>" and "same <attribute name>," where "different" and "same" are the template text of the label template selected by the group generator 142 and <attribute name> is replaced with the name of an attribute).

If the value of an attribute is a numerical value, the group generator 142 can generate three groups for the attribute (e.g., labeled "larger <attribute name>" or "higher <attribute name>," "same <attribute name>" or "equal <attribute name>," and "smaller <attribute name>" or "lower <attribute name>," where "larger," "higher," "same," "equal," "smaller," and "lower" are the template text of the label template selected by the group generator 142 and <attribute name> is replaced with the name of an attribute). If the value of an attribute is a binary value (e.g., "yes" or "no"), the group generator 142 can generate two groups for the attribute (e.g., labeled "with <attribute name>" and "without <attribute name>," where "with" and "without" are the template text of the label template selected by the group generator 142 and <attribute name> is replaced with the name of an attribute). These examples are merely for illustrative purposes and are not meant to be limiting. The group generator 142 may generate other numbers of groups for various attributes and/or may select other label templates for the corresponding group labels.

Once the groups and group labels are generated, the group generator 142 can populate the groups with items identified by the item recommender 130. The items identified by the item recommender 130 may vary based on which user or user device 102 has selected a particular seed item. Thus, the group generator 142 can provide an indication of a seed item and an indication of a user and/or user device 102 to the item recommender 130. The item recommender 130 then returns a list of related items that may be specific to the seed item and/or user and/or user device 102. The group generator 142 can then, for some or all of the related items, compare the attribute values of the respective related item to the attribute values of the seed item to identify to which group(s) the respective related item belongs. For example, if the attribute value of a first attribute is the same for a related item and a seed item, and the attribute value is text, then the group generator 142 can assign the related item to a group that has a label that references the name of the first attribute and the word "same" (or equivalent language) Likewise, if the attribute value of a first attribute is different for a related item and a seed item, and the attribute value is a binary value, then the group generator 142 can assign the related item to a group that has a label that references the name of the first attribute and the word "with" (e.g., if the related item has an attribute value of "yes") or "without" (e.g., if the related item has an attribute value of "no"). Alternatively, the group generator 142 can, for some or all of the related items, identify to which group(s) the respective related item belongs based on comparing the attribute values of the respective related item to information identifying the generated groups and/or group labels (e.g., a group and/or group label may be associated with a condition, and the comparison may yield a determination as to whether the attribute value of the related item satisfies the condition (in which case the related item belongs to the group)). The group generator 142 can repeat the comparison operations for each attribute of the seed item and/or a related item.

In some embodiments, the group generator 142 can assign a related item to multiple groups. As an illustrative example, the seed item may be a 55" 4K television made by manufacturer ABC. A related item may be a 60" 4K television made by manufacturer DEF. The related item has a larger screen size than the seed item, so the group generator 142 may assign the related item to the group labeled "larger screen size." Likewise, the related item and the seed item have the same screen resolution, so the group generator 142 may also assign the related item to the group labeled "same screen resolution." Finally, the related item and the seed item are made by different manufacturers, so the group generator 142 may also assign the related item to the group labeled "different brand" or "different manufacturer."

In other embodiments, the group generator 142 does not assign a related item to any group if the related item qualifies for membership in multiple groups that identify a difference from the seed item. For example, in the example above, the related item qualifies for membership in two groups that identify a difference from the seed item (e.g., "larger screen size" and "different brand"). Thus, the group generator 142 may not assign the related item to any of the three groups described above. However, if a related item instead was a 55" 1080p television made by manufacturer ABC, then the group generator 142 may assign the related item to the groups labeled "lower screen resolution," "same screen size," and/or "same brand."

Once the group generator 142 has assigned the related items to one or more groups, the group generator 142 can optionally determine whether any groups are not assigned any related items. If this is the case, the group generator 142 can delete such groups so that a resulting user interface does not display empty groups.

Within each group, the group generator 142 can order the assigned related items alphabetically, by price, by rating, by age of item, by likelihood that a related item will be selected by a user or user device 102, and/or the like. For example, relevance scores stored in the relevance score data store 170 may serve as an indication of the likelihood that a user or user device 102 will select an item. Thus, the group generator 142 can query the relevance score data store 170 for the relevance scores of some or all of the related items assigned to a group. The relevance scores may vary based on the user or user device 102, and thus the group generator 142 may also provide to the relevance score data store 170 an identity of the user or user device 102. The group generator 142 can then use the obtained relevance scores to order the related items in a group (e.g., from most relevant to least relevant, where the most relevant related items will be displayed first in the user interface). Alternatively, the item recommender 130 (or another component internal or external to the recommendation system 104, not shown) may provide other values that represent the likelihood that a user or user device 102 will select a related item, and the group generator 142 can use the other values to order the related items.

Once the group generator 142 has generated the groups and corresponding labels, assigned related items to some or all of the groups, and ordered the assigned related items within each group, the group ranker 144 may begin the process of ordering the groups. In particular, the group generator 142 can order the groups based on the relevance of each group (e.g., where the group with the highest relevance is ranked and displayed in a user interface first).

For example, the group ranker 144 can obtain relevance scores of the related items assigned to the groups from the relevance score data store 170. As mentioned above, the relevance scores may vary based on the user or user device 102, and thus the group ranker 144 can obtain relevance scores specific to a user or user device 102 during the query to the relevance score data store 170 (e.g., by providing an identification of a user or user device 102). In one embodiment, the group ranker 144 can average the relevance scores of each related item assigned to a group to determine the relevance score of a group.

In another embodiment, the group ranker 144 can determine a weighted average of the relevance scores of each related item assigned to a group to determine the relevance score of a group. For example, the related items assigned to a group were previously ordered by the group generator 142, and the relevance score of the first related item may be weighted higher than the relevance score of the second related item, the relevance score of the second related item may be weighted higher than the relevance score of the third related item, and so on. If a group has a large number of related items assigned therein, taking a weighted average may result in the related items ordered near the end of the list of related items having less of an impact on the overall group relevance score. This may produce more appropriate group relevance scores (and group rankings) given that users often may not browse through all of the related items assigned to a group if a large number of related items are assigned therein. The related items that the user likely will view and consider (e.g., the related items ordered near the beginning) would then factor more heavily in the overall group relevance score (and group rankings).

In a relatively simplistic process, the group ranker 144 can, for each group, average or take a weighted average of the relevance scores of all related items assigned to the respective group to determine the relevance score of the respective group. Once the group ranker 144 has determines the relevance scores of each group, the group ranker 144 can rank the groups by relevance score.

In a more advanced process, the group ranker 144 can, for each group, average or take a weighted average of the relevance scores of all related items assigned to the respective group to determine a preliminary relevance score of the respective group. The group ranker 144 can then identify the group with the highest preliminary relevance score and rank that group first. The group ranker 144 may then repeat the process for the remaining groups (e.g., all groups other than the group ranked first) to determine preliminary relevance scores for the remaining groups. However, as mentioned above, the same related item can be assigned to multiple groups. To reduce the likelihood that a related item with a high relevance score causes multiple groups to appear first—possibly resulting in duplicate related items being initially displayed in the user interface (e.g. the same related item being displayed in multiple groups)—the group ranker 144 can modify the relevance scores of the related items assigned to the group ranked first to 0 or to a very low value (e.g., an order or magnitude lower than the lowest related item relevance score) prior to repeating the relevance score determination process for the remaining groups. The group ranker 144 can then use the modified relevance scores in determining the preliminary relevance scores for the remaining groups. The group ranker 144 ranks the remaining group with the highest preliminary relevance score second, modifies the relevance scores of the related items assigned to the second-ranked group to 0 (or to some low value), and then repeats the process again for the remaining groups (e.g., all groups other than the groups ranked first and second) until some or all of the remaining groups are ranked.

As an illustrative example, a first related item (with a relevance score of 0.1), a second related item (with a relevance score of 0.2), and a third related item (with a relevance score of 0.3) may be assigned to a first group, a fourth related item (with a relevance score of 0.13), a fifth related item (with a relevance score of 0.1), and a sixth related item (with a relevance score of 0.1) may be assigned to a second group, and the first related item, the fifth related item, and a seventh related item (with a relevance score of 0.16) may be assigned a third group. Taking the average approach, the group ranker 144 may determine that a preliminary relevance score for the first group is 0.2, a preliminary relevance score of the second group is 0.11, and a preliminary relevance score of the third group is 0.12. Thus, the group ranker 144 ranks the first group first. Because the first, second, and third related items are assigned to the first group, the group ranker 144 then modifies the relevance scores of these related items to be 0, and determines new preliminary relevance scores for the second and third group. Using the unmodified relevance scores, the third group has a higher preliminary relevance score than the second group. However, now that the relevance scores have been modified, the group ranker 144 determines that the second group has a higher preliminary relevance score than the third group (e.g., 0.11 to 0.0866) given that the relevance score of the first related item is now 0, and therefore ranks the second group second.

The group ranker 144 can repeat this process until no groups are left unranked. Alternatively, the group ranker 144 can stop this process after N (e.g., any integer, such as 1, 2, 3, 4, 5, 6, etc.) groups have been ranked. For example, the user interface may have a finite amount of space, and thus the recommendation system 104 may determine to display only the top N-ranked groups. Accordingly, the group ranker 144 can rank N groups and then stop the ranking process.

In further embodiments, the group ranker 144 considers related item relevance scores in conjunction with the importance of various seed item attributes to determine the order in which groups should be ranked. For example, the attribute importance data store 180 may store attribute importance values for various attributes, such as attributes of a seed item. The importance of various attributes may vary based on a user or user device 102, and thus the attribute importance data store 180 can store a plurality of attribute importance values for each attribute. The group ranker 144 can obtain the attribute importance values from the attribute importance data store 180 that correspond with the attributes of the seed item and the user or user device 102. The group ranker 144 can then, for each group, determine a relevance score for the respective group (in any manner as described above), and combine the relevance score with the attribute importance value corresponding to the respective group (e.g., attribute). For example, the combination can be a weighted combination of the relevance score and the attribute importance value. The group ranker 144 can then determine the highest ranked group based on the group that has the highest combination of relevance score and attribute importance value.

Alternatively or in addition, the group ranker 144 can determine the order of groups at least in part based on a current browsing session. For example, information indicating the types of items that a user views during a current browsing session may be provided to the group ranker 144 (e.g., by the network-accessible system 120), and the group ranker 144 can use this information to refine the determined order of groups. As an illustrative example, a user may browse to content pages of specific televisions with a first attribute during a current browsing session. The group ranker 144 normally may have ordered a group corresponding to the first attribute fourth (e.g., based on the relevance scores and/or attribute importance values). However, based on the current browsing session information, the group ranker 144 may instead order the group corresponding to the first attribute higher than fourth (e.g., third, second, or first).

Optionally, the group generator 142 can use the attribute importance values to determine which groups to assign to a related item. In particular, for a related item that qualifies for multiple groups that identify a difference from the seed item, the group generator 142 can assign the related item to the group that identifies a difference from the seed item that has the highest importance. For example, if the group generator 142 determines that a related item differs from the seed item with respect to a first attribute and a second attribute, and that an importance score of the first attribute is higher than than the importance score of the second attribute, the group generator 142 can assign the related item only to the group corresponding to the higher importance score (e.g., the group corresponding to the first attribute).

The user interface generator 146 can generate a user interface for display on a user device 102 in response to a user device 102 requesting a certain content page. For example, the user device 102 can request a content page from the network-accessible system 120 via the network 110. The network-accessible system 120 may generally serve as network-facing component that receives requests for content pages from user devices 102 and provides corresponding data to the user devices 102 in response (e.g., user interface data that, when rendered by a user device 102, causes the user device 102 to display a requested content page). Once a request is received, the network-accessible system 120 can forward the request to the recommendation system 104. The user interface generator 146 can retrieve data associated with a seed item corresponding to the requested content page from the items data store 150. The user interface generator 146 can also retrieve, from the group generator 142 and/or the group ranker 144 (and/or from a local or external data store, not shown), information identifying the groups that have been generated for the seed item and/or user or user device 102, the related items assigned to each group, which groups are to be displayed, and/or the order in which some or all of the groups are to be displayed. The user interface generator 146 can obtain data associated with the appropriate related items from the items data store 150 (e.g., attribute values for various attributes of the related items), and use the obtained information to generate user interface data that, when rendered by the user device 102, causes the user device 102 to display a requested content page in a user interface). The user interface generator 146 can transmit the user interface data to the network-accessible system 120, and the network-accessible system 120 can transmit the user interface data to the user device 102 to satisfy the initial request. An example user interface is described in greater detail below with respect to FIGS. 5A-5B.

The group generator 142 and/or group ranker 144 can perform the operations described herein before a user or user device 102 requests a content page corresponding to a seed item. By predetermining group names, related item assignments, and group rankings, the user interface generator 146 can more quickly generate a requested content page, thereby reducing user device 102 page load latency.

In some embodiments, some or all of the data used to determine group names, related item assignments, and/or group rankings is not available prior to a user or user device 102 requesting a content page corresponding to a seed item. In such a situation, the recommendation system 104 can perform the operations described herein that can be performed with the available data, and then can perform any remaining operations once the user or user device 102 has requested the content page corresponding to the seed item. In other embodiments, the recommendation system 104 performs the operations described herein after the user or user device 102 requests a content page corresponding to a seed item.

As a user of the user device 102 interacts with the provided user interface, the user device 102 may transmit feedback data to the network-accessible system 120, and the network-accessible system 120 can transmit the feedback data to the rankings updater 148. The rankings updater 148 can use the feedback data to, for example, update the importance scores stored in the attribute importance data store 180 (and thus potentially affect how the group ranker 144 ranks groups in the future).

For example, the user interface may depict carousel display objects that each correspond to a group. The feedback data may indicate which carousel display objects a user expanded, which carousel display objects a user collapsed, which carousel display objects a user passed over (e.g., a user may pass over a carousel display object if the user browses through related items associated with a first-ranked group corresponding to a first carousel display object displayed first, then browses through related items associated with a third-ranked group corresponding to a third carousel display object displayed third without browsing through related items associated with a second-ranked group corresponding to a second carousel display object displayed second), etc. If a user expands a certain carousel display object (thereby indicating that the user is interested in viewing related items assigned to the group corresponding to the carousel display object), the rankings updater 148 may determine that the group corresponding to the carousel display object is of more importance to the user and may increase the importance score that is associated with the group and user or user device 102 stored in the attribute importance data store 180. In contrast, if a user collapses a certain carousel display object (thereby indicating that the user is not interested in viewing related items assigned to the group corresponding to the carousel display object), the rankings updater 148 may determine that the group is of less importance to the user and may decrease the importance score that is associated with the group and user or user device 102 stored in the attribute importance data store 180. Likewise, if a user passes over a certain carousel display object (thereby indicating that the user is not interested in viewing related items assigned to the group corresponding to the carousel display object), the rankings updater 148 may determine that the group is of less importance to the user and may decrease the importance score that is associated with the group and user or user device 102 stored in the attribute importance data store 180.

The techniques described herein can be implemented by the recommendation system 104 as long as the seed items and/or related items have at least one known attribute value (e.g., which means that a related item can be assigned to at least one group). Thus, even if the values of certain seed item and/or related item attributes are missing, the recommendation system 104 can still perform the operations described herein.

One possible method that may be implemented by the recommendation system 104 is described below. For example, the following function may measure the quality of a layout (e.g., the quality of a certain grouping and labeling of related items):

$$SBD_F = \frac{1}{\sum_{x \in X(s)} r(x)} \sum_{i=1}^{l} \sum_{j=1}^{|A_i|} \tilde{r}(a_{ij})g(i)c(j) \qquad (1)$$

where $A_1, \ldots, A_l$ represent the various groups, $r(a_{ij})$ or $r(x)$ represents a relevance score of related item $a_{ij}$ (where $\tilde{r}(a_{ij})$ equals $r(a_{ij})$ if i,j is the first occurrence of the related item (e.g., not present in a group that has already been ranked), otherwise $\tilde{r}(a_{ij})$ equals 0 or a low value), $X(s)$ represents the set of items related to the seed item (where the seed item is not included in $X(s)$), $g(i)$ represents the probability that a user will review carousel i, and $c(j)$ represents the probability that a user will review item j in a carousel.

To perform an accurate ranking, equation (1) should be maximized. One option for maximizing equation (1) is by implementing (e.g., using the recommendation system 104) the following algorithm:
Data: groups $Z_1, \ldots, Z_m$, relevance score for each item $r(z_{ij})$
Result: selection of top $1 < m$ groups $A_1, \ldots A_l$
for i=1, . . . , l do
   for k=1, . . . , m do
     sort $\{z_{kl}, \ldots, z_{kn(k)}\}$ from most relevant to least relevant;
     group score$(Z_k) = \sum_{j=1}^{n(k)} c(j) r(z_{kj})$;
   end
   $A_i = Z_{\hat{k}}$, where $\hat{k} = \arg\max_k$ group score$(Z_k)$;
   for j=1, . . . , $n(\hat{k})$ do
     set $r(z_{\hat{k}j})$ to 0;
   end
end Thus, by implementing the above algorithm, the recommendation system 104 selects groups one by one. In each selection round, a group with the maximum score $\sum_{j=1}^{n(k)} c(j) r(z_{kj})$ is selected. Sorting can be performed to maximize the group score given that $c(j)$ is a decreasing function. The relevance scores for related items in already selected groups are suppressed (e.g., 0 or a low value), so that repeat related items do not contribute to the objective. In some embodiments, l is kept small (e.g., 3).

The recommendation system 104, the network-accessible system 120, and/or the item recommender 130 may be a single computing device, or may include multiple distinct computing devices, such as computer servers, logically or physically grouped together to collectively operate as a server system. The components of the recommendation system 104, the network-accessible system 120, and/or the item recommender 130 can each be implemented in application-specific hardware (e.g., a server computing device with one or more ASICs) such that no software is necessary, or as a combination of hardware and software. In addition, the modules and components of the recommendation system 104, the network-accessible system 120, and/or the item recommender 130 can be combined on one server computing device or separated individually or into groups on several server computing devices. In some embodiments, the recommendation system 104, the network-accessible system 120, and/or the item recommender 130 may include additional or fewer components than illustrated in FIG. 1.

In some embodiments, the features and services provided by the recommendation system 104, the network-accessible system 120, and/or the item recommender 130 may be implemented as web services consumable via the communication network 110. In further embodiments, the recommendation system 104, the network-accessible system 120, and/or the item recommender 130 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The items data store 150 stores attribute values for various items (e.g., products like books, clothing, electronics, etc.; video, such as television shows, movies, etc.; music; etc.). While the items data store 150 is depicted as being located external to the recommendation system 104, this is not meant to be limiting. For example, in other embodiments not shown, the items data store 150 is located internal to the recommendation system 104.

The user data store 160 stores user data for various users and/or user devices 102 (user interests, user hobbies, user age, user gender, user purchase history, user search history and/or current search queries, user subscriptions, actions performed by the user in prior browsing sessions, parts of a screen a user typically clicks while browsing, etc.). While the user data store 160 is depicted as being located external to the recommendation system 104, this is not meant to be limiting. For example, in other embodiments not shown, the user data store 160 is located internal to the recommendation system 104.

The relevance score data store 170 stores relevance scores (which can also be referred to as similarity scores or substitute scores) for various items. Each item may be associated in the relevance score data store 170 with one or more relevance scores given that the relevance score may vary based on user or user device 102. While the relevance score data store 170 is depicted as being located external to the recommendation system 104, this is not meant to be limiting. For example, in other embodiments not shown, the relevance score data store 170 is located internal to the recommendation system 104 or is embodied within the items data store 150.

The attribute importance data store 180 stores attribute importance values for various attributes of different types of items (e.g., where each type of item is associated with a different set of attributes). Each attribute may be associated in the attribute importance data store 180 with one or more attribute importance values given that the attribute importance value may vary based on user or user device 102. While the attribute importance data store 180 is depicted as being located external to the recommendation system 104, this is not meant to be limiting. For example, in other embodiments not shown, attribute importance data store 180 is located internal to the recommendation system 104.

While the the recommendation system 104, the network-accessible system 120, and/or the item recommender 130, the items data store 150, the user data store 160, the relevance score data store 170, and the attribute importance data store 180 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a catalog page delivery service) can communicate with one or more of the user devices 102 via the network 110.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In one embodiment, the user devices 102 runs a browser application in order to communicate with the network-accessible system 120 (and/or the catalog page delivery service).

In some embodiments, the network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagram for Generating, Ranking, and Displaying Groups

Figure 2A:
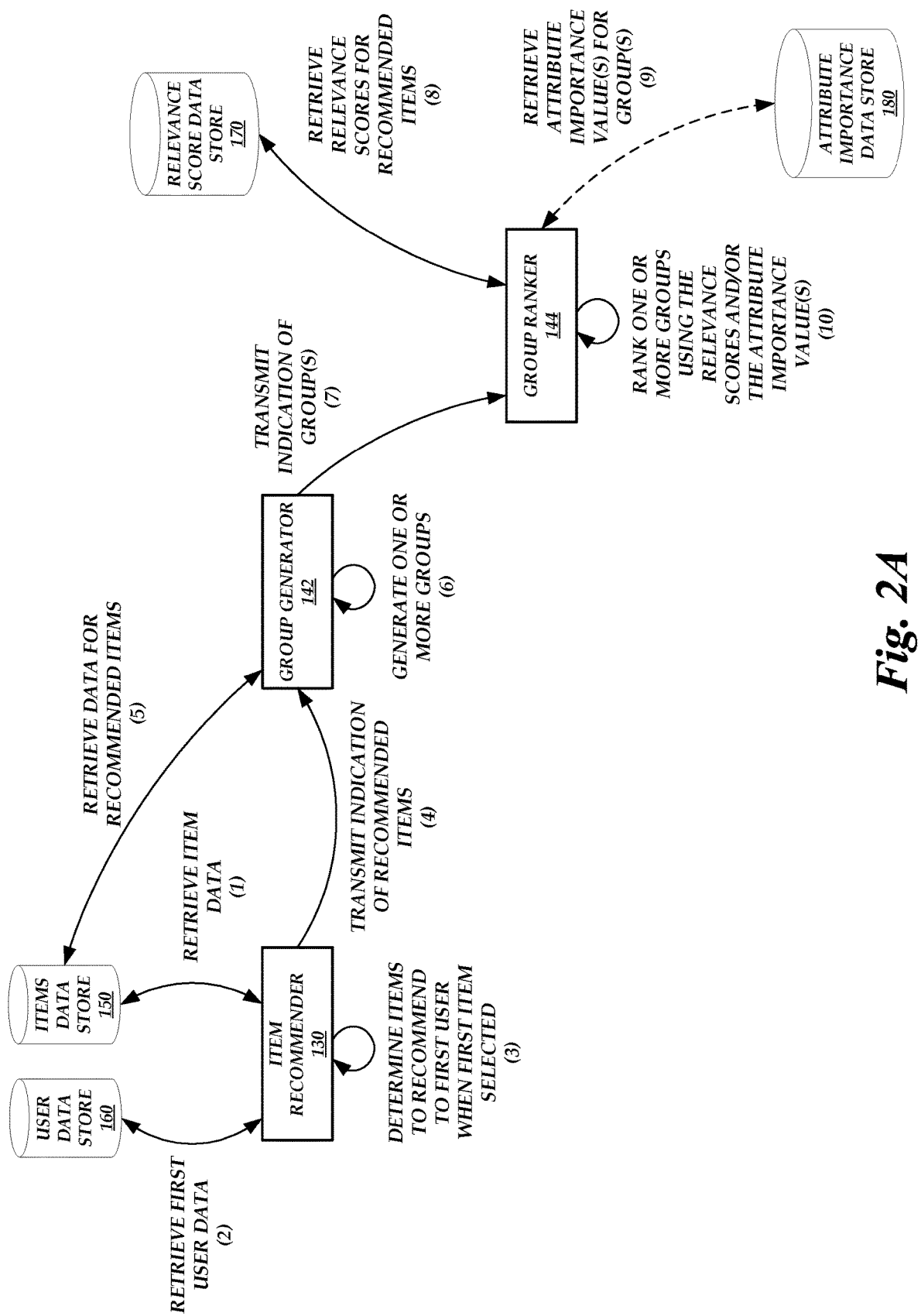
FIG. 2A is a block diagram of the operating environment of FIG. 1 illustrating the operations performed by the components of the operating environment to generate and rank groups, according to one embodiment.

FIG. 2A is a block diagram of the operating environment 100 of FIG. 1 illustrating the operations performed by the components of the operating environment 100 to generate and rank groups, according to one embodiment. In an embodiment, the operations performed by the components of the operating system 100 (e.g., to generate groups, populate groups, rank groups, etc.) are performed prior to a user device 102 requesting a content page.

As illustrated in FIG. 2A, the item recommender 130 retrieves item data from the items data store 150 at (1). The item recommender 130 also retrieves first user data from the user data store 160 at (2), where the first user data corresponds to a first user or user device 102. The item recommender 130 then determines items to recommend to a first user when a first item is selected at (3). For example, the item recommender 130 may identify items related to the first item that the user may be interested in viewing and/or obtaining. In some embodiments, the item recommender 130 may identify items related to the first item by looking up the information in a previously-generated item-to-item mapping table, which may be generated based on aggregated purchase history data and/or aggregated viewing history, as described in the '074 patent incorporated above. The item recommender 130 can transmit an indication of the recommended items (e.g., the related items) to the group generator 142 at (4).

The group generator 142 can retrieve data for the recommended items (e.g., related items) from the items data store 150 at (5). For example, the group generator 142 can retrieve the values of attributes of the recommended items. Using the retrieved data, the group generator 142 can generate one or more groups at (6). Generation of the groups can include the group generator 142 determining which groups to generate based on the attributes of the first item, generating labels for these groups based on the values of the first item attributes and label templates, and populating the groups based on the values of the attributes of the related items. Optionally, the group generator 142 can delete or remove any groups that are left unpopulated such that these groups are not displayed in the eventual user interface.

Once the groups are generated, the group generator 142 can transmit an indication of the group(s) to the group ranker 144 at (7). The group ranker 144 can retrieve relevance scores for the recommended items (e.g., related items) from the relevance score data store 170 at (8). The group ranker 144 can also optionally retrieve attribute importance value(s) for the group(s) (e.g., for the attribute(s) associated with the group(s)) from the attribute importance data store 180 at (9). The group ranker 144 can then rank one or more of the groups using the relevance scores and/or the attribute importance value(s) at (10). For example, as discussed above, the group ranker 144 can determine the relevance score of a group based on the unmodified and/or modified relevance scores of the related items assigned to the group. The group ranker 144 can rank the group with the highest relevance score first (or the group with the highest combination of relevance score and attribute importance value first), the group with the second highest relevance score second (or the group with the second highest combination of relevance score and attribute importance value second), and so on. Alternatively, the group ranker 144 can rank the group with the highest relevance score first (or the group with the highest combination of relevance score and attribute importance value first), then repeat the process for the remaining groups after modifying the relevance scores of the related items assigned to the first-ranked group to 0 or to a low value.

While FIG. 2A depicts operations that are performed to generate and rank groups corresponding to a first item (e.g., the seed item) and the first user, this is merely for illustrative purposes and is not meant to be limiting. Before a content page is requested, the components depicted in FIG. 2A can generate and rank groups corresponding to any item available in the electronic catalog and/or to any user or user device 102 for which information is available (e.g., user data).

Figure 2B:
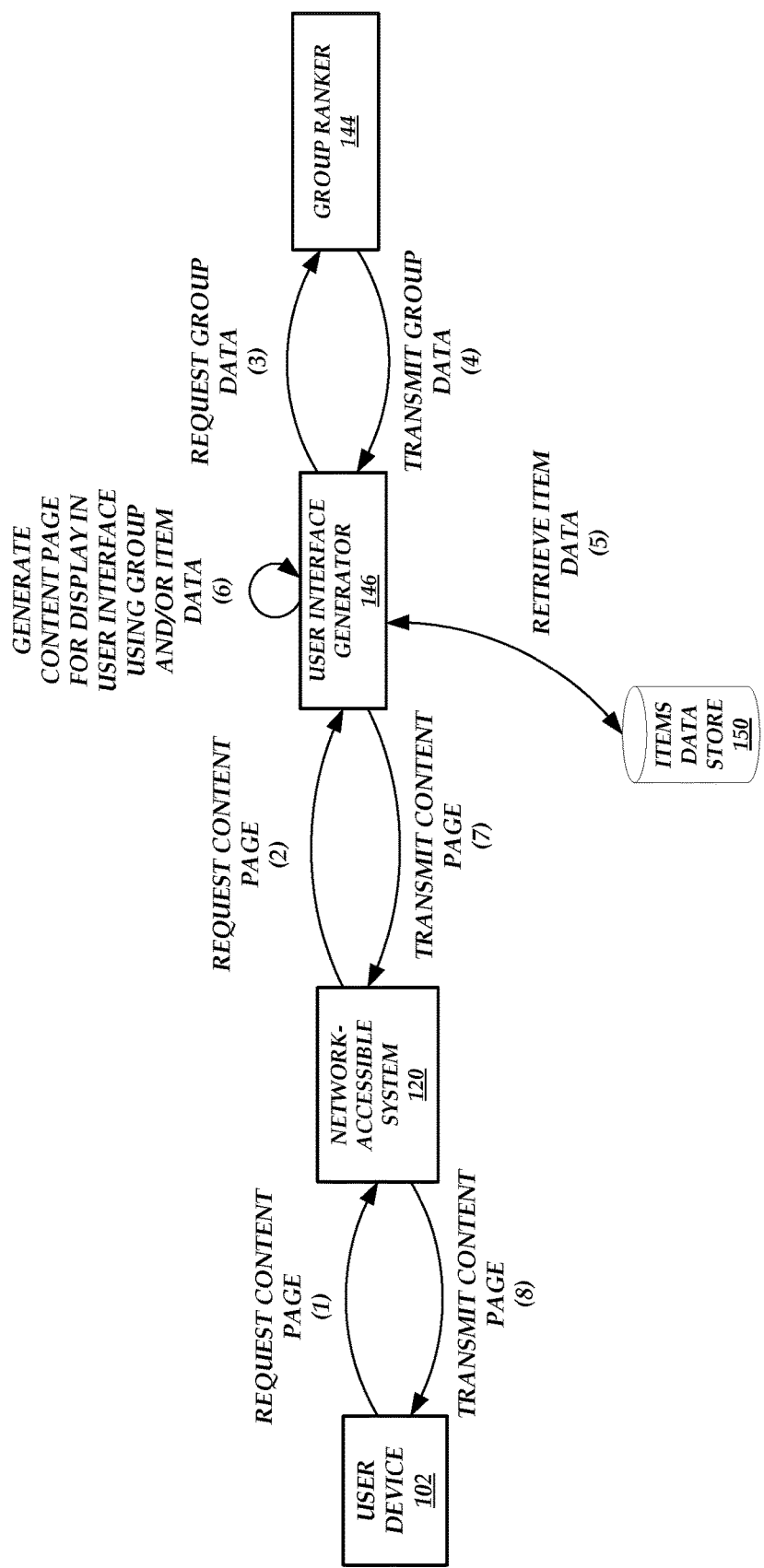
FIG. 2B is a block diagram of the operating environment of FIG. 1 illustrating the operations performed by the components of the operating environment to display generated groups, according to one embodiment.

FIG. 2B is a block diagram of the operating environment 100 of FIG. 1 illustrating the operations performed by the components of the operating environment 100 to display generated groups, according to one embodiment. As illustrated in FIG. 2B, a user device 102 requests from the network-accessible system 120 a content page at (1). In response, the network-accessible system 120 forwards the content page request to the user interface generator 146 at (2).

The user interface generator 146 can request group data from the group ranker 144 at (3). For example, the group data may include information identifying the groups that have been generated, labels for each group, related items assigned to each group, the number of groups to be displayed, and/or the order in which some or all of the groups are to be displayed. In response, the group ranker 144 transmits the group data to the user interface generator 146 at (4). The group generator 142 and/or group ranker 144 may have previously generated the group data (e.g., before the user device 102 requests the content page at (1)), or may generate the group data in response to the user device 102 requesting the content page at (1). Alternatively, the user interface generator 146 can obtain the group data from a data store (not shown) internal or external to the recommendation system 104.

The user interface generator 146 also retrieves item data from the items data store 150 at (5). For example, the item data can include the values of attributes of the various related items assigned to the generated groups, including images of the related items, ratings of the related items, an indication of whether the related items are eligible for certain promotions (e.g., faster or free shipping), and/or the like. The user interface generator 146 can then generate a content page for display in a user interface using the group and/or item data at (6). For example, the user interface generator 146 may generate user interface data that, when rendered by the user device 102, may cause the user device 102 to display the content page in a user interface. The generated content page may include different sections or windows dedicated to the groups to be displayed, where the related items assigned to a displayed group are displayed in a carousel view (e.g., at least a portion of the related items assigned to a displayed group may be visible in the content page and the remaining related items assigned to a displayed group may be visible by scrolling, selecting browsing arrow buttons, etc.). Additional features of the content page are described in greater detail below with respect to FIGS. 5A-5B.

The user interface generator 146 can then transmit the content page (e.g., the user interface data) to the network-accessible system 120 at (7). The network-accessible system 120 can then transmit the content page to the user device 102 at (8) to satisfy the initial content page request.

Example Block Diagram for Updating the Group Ranking Process

Figure 3:
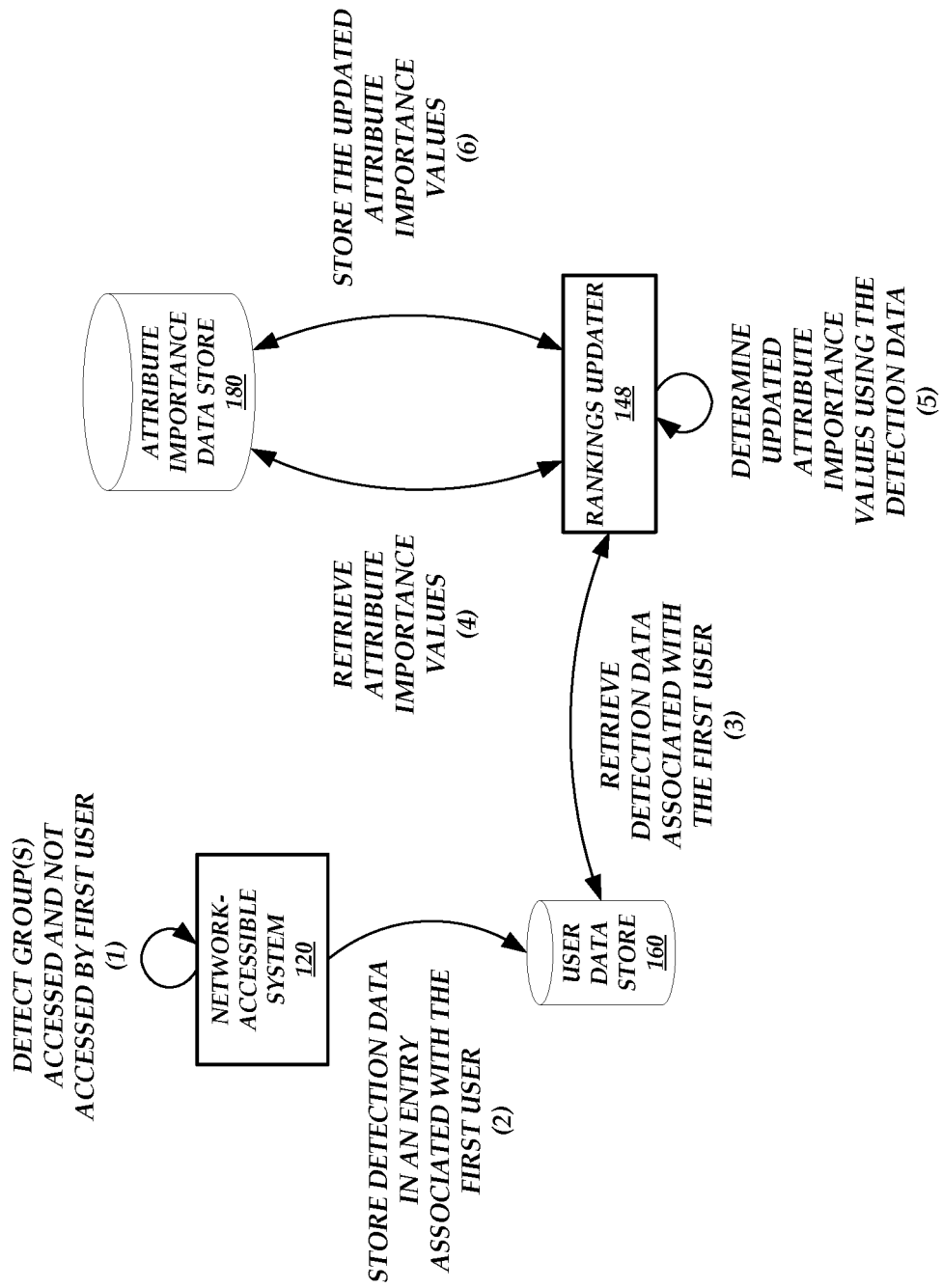
FIG. 3 is a block diagram of the operating environment of FIG. 1 illustrating the operations performed by the components of the operating environment to update the group ranking process, according to one embodiment.

FIG. 3 is a block diagram of the operating environment 100 of FIG. 1 illustrating the operations performed by the components of the operating environment 100 to update the group ranking process, according to one embodiment. For example, a content page may have been delivered to a user device 102, and the first user operating the user device 102 may be interacting with the page. As illustrated in FIG. 3, the network-accessible system 120 may detect group(s) (and/or carousel display object(s)) accessed and not accessed by the first user at (1). For example, the first user may have expanded one carousel display object corresponding to a group to view the related items assigned to the group and/or selected a related item assigned to the group (and/or otherwise interacted with the carousel display object corresponding to the group), and the network-accessible system 120 may detect such actions as the first user accessing the group (and/or carousel display object). On the other hand, the first user may have collapsed one carousel display object corresponding to a group without browsing through or selecting any related item assigned to the group and/or may have passed over the carousel display object corresponding to the group (e.g., interacted with a carousel display object corresponding to a group ranked lower than the subject group without interacting with the carousel display object corresponding to the subject group), and the network-accessible system 120 may detect such actions as the first user not accessing the group (and/or carousel display object).

The network-accessible system 120 can store this detection data (e.g., also referred to herein as feedback data) in the user data store 160 at (2) in an entry associated with the first user. Thus, information indicating whether the first user accessed a group (and thus found the attribute corresponding to the group to be important) or did not access a group (and thus found the attribute corresponding to the group to be less important) is available for further processing.

In particular, the rankings updater 148 can retrieve the detection data associated with the first user from the user data store 160 at (3). The rankings updater 148 can retrieve the detection data while the first user is interacting with the content page, after the first user has finished interacting with the content page and is now viewing or has selected another content page, after a browsing session of the first user is complete, etc. The rankings updater 148 can also retrieve attribute importance values that are associated with the attributes associated with the groups corresponding to carousel display objects displayed in the content page and that are associated with the first user from the attribute importance data store 180 at (4).

The rankings updater 148 can determine updated attribute importance values using the detection data at (5). For example, if the detection data indicates that the first user accessed a group, the rankings updater 148 may increase the attribute importance value of the attribute associated with that group. On the other hand, if the detection data indicates that the first user did not access a group, the rankings updater 148 may decrease the attribute importance value of the attribute associated with that group. The rankings updater 148 can then store the updated attribute importance values in the attribute importance data store 180 at (6). Thus, if the group ranker 144 uses attribute importance values to rank groups, the group ranker 144 can use the updated attribute importance values the next time the group ranker 144 is tasked with ranking groups. By updating attribute importance values, the rankings updater 148 can then improve the accuracy of the ranking process implemented by the group ranker 144 over time as feedback is gathered from various users.

Example Test Policy Simulation Routine

Figure 4:
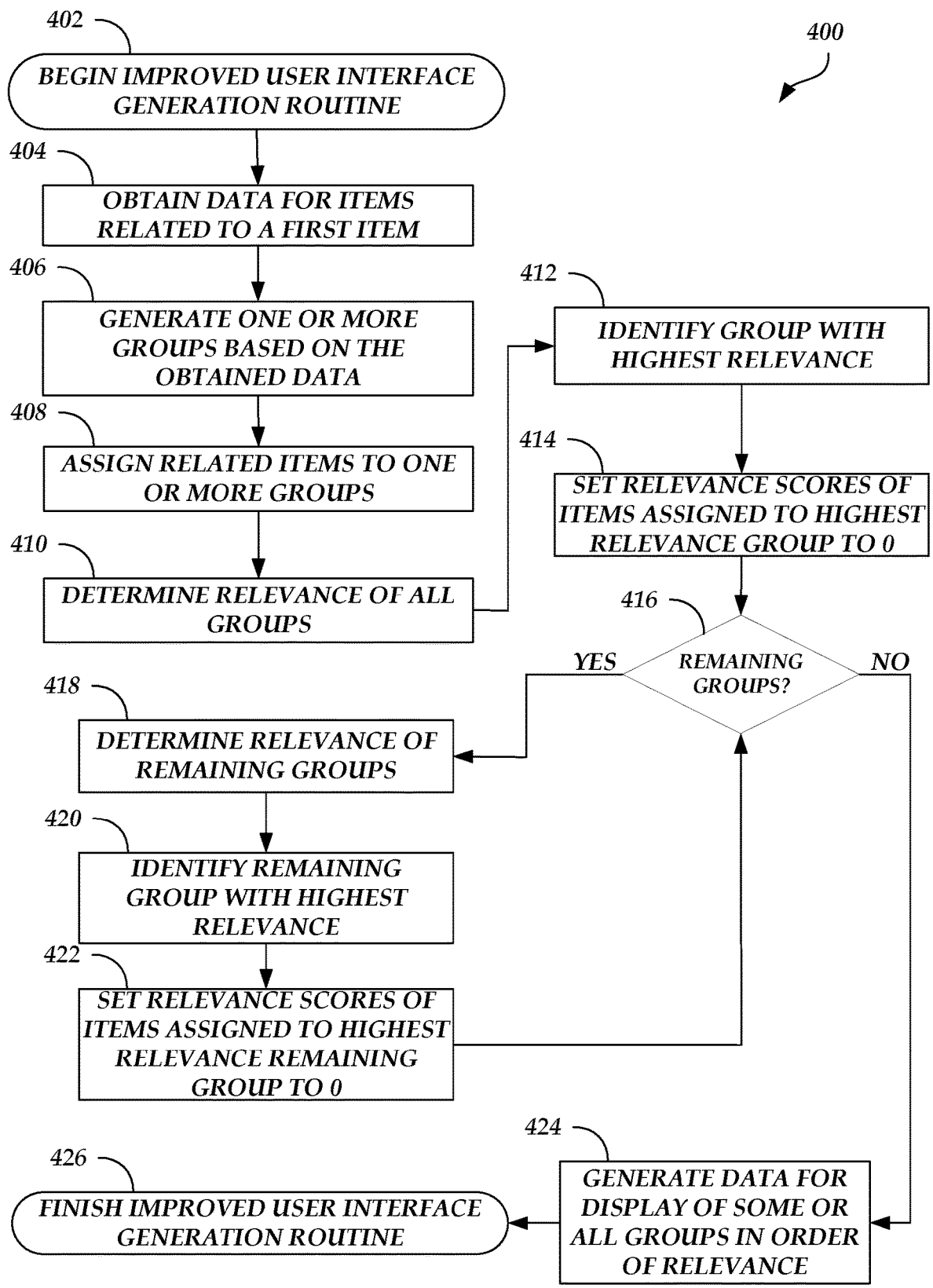
FIG. 4 is a flow diagram depicting an improved user interface generation routine illustratively implemented by a recommendation system, according to one embodiment.

FIG. 4 is a flow diagram depicting an improved user interface generation routine 400 illustratively implemented by a recommendation system, according to one embodiment. As an example, the recommendation system 104 of FIG. 1 can be configured to execute the improved user interface generation routine 400. The improved user interface generation routine 400 begins at block 402.

At block 404, data for items related to a first item are obtained. For example, the data can include related item attribute values, relevance scores, and/or the like.

At block 406, one or more groups are generated based on the obtained data. For example, different groups can be created based on the attributes of the first item and labels for the groups can be generated based on the values of the first item attributes.

At block 408, related items are assigned to one or more groups. For example, the groups can be populated with one or more related items based on similarities or differences between the first item attribute values and the related item attribute values. A related item may be assigned to one or a plurality of groups. Optionally, any groups that are not populated with a related item can be discarded.

At block 410, the relevance of all groups is determined. For example, the relevance of a group can be determined based on the relevance scores of the related items assigned to the group and/or the attribute importance value corresponding to the attribute associated with the group.

At block 412, the group with the highest relevance is identified. For example, the group with the highest relevance may be the group with the highest relevance score, the highest attribute importance value, or the highest combination of relevance score and attribute importance value.

At block 414, the relevance scores for the items assigned to the highest relevance group are set to 0 (or to a low value). For example, to discourage duplicate related items from appearing within the user interface, the relevance scores for the items assigned to the highest relevance group can be set to 0 (or to a low value) to reduce the likelihood that other groups to which the items are assigned are ranked highly (and thus to reduce the likelihood that one item initially displayed in a highly ranked group is also initially displayed in another highly ranked group).

At block 416, a determination is made as to whether there are any remaining groups to rank. There may be remaining groups to rank if some groups are not ranked or if N groups are to be depicted in a content page, yet less than N groups have been ranked. If there are remaining groups to rank, the improved user interface generation routine 400 proceeds to block 418. Otherwise, if there are no more groups to rank, the improved user interface generation routine 400 proceeds to block 424.

At block 418, the relevance of the remaining groups (e.g., the groups other than the highest relevance group) is determined. For example, the relevance is determined using the new relevance scores for the items assigned to the highest relevance group set in block 414.

At block 420, the remaining group with the highest relevance is identified. For example, the remaining group with the highest relevance may be the remaining group with the highest relevance score, the highest attribute importance value, or the highest combination of relevance score and attribute importance value.

At block 422, the relevance scores of the items assigned to the highest relevance remaining group is set to 0 (or to a low value). The improved user interface generation routine 400 then proceeds back to block 416 to repeat the process until all remaining groups to rank have been ranked.

At block 424, once all remaining groups to rank have been ranked, data for the display of some or all of the groups in order of relevance is generated. For example, the data may be user interface data that, when rendered by a user device 102, causes the user device 102 to display a content page in a user interface, where the content page depicts some or all of the ranked groups and some or all of the related items assigned thereto. Once the data is generated, the improved user interface generation routine 400 ends, as shown at block 426.

Example Improved User Interface

Figure 5A:
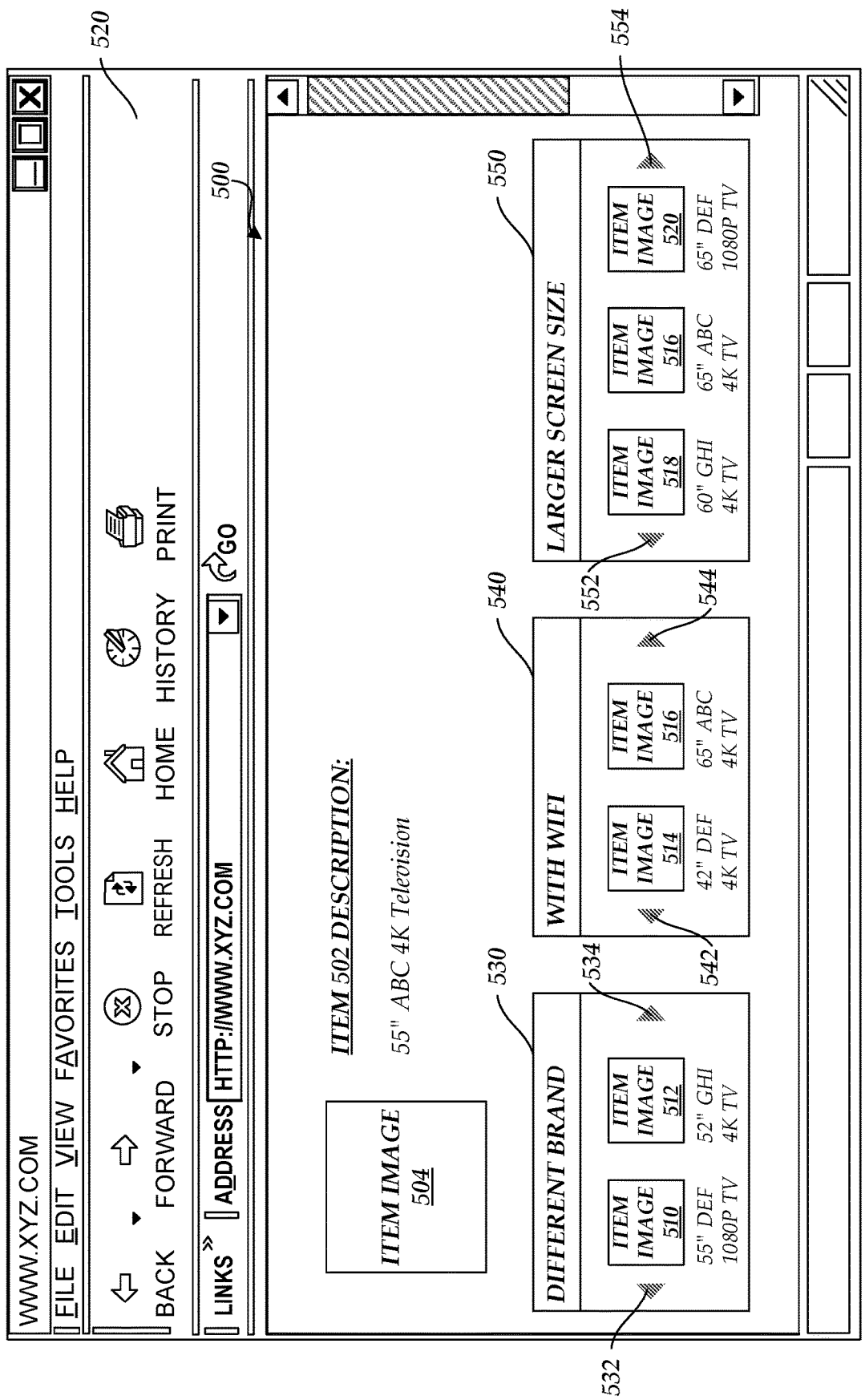
FIGS. 5A-5B illustrate example user interfaces depicting a content page that is displayed in a browser application running on a user device, such as the user device of FIG. 1.
Figure 5B:
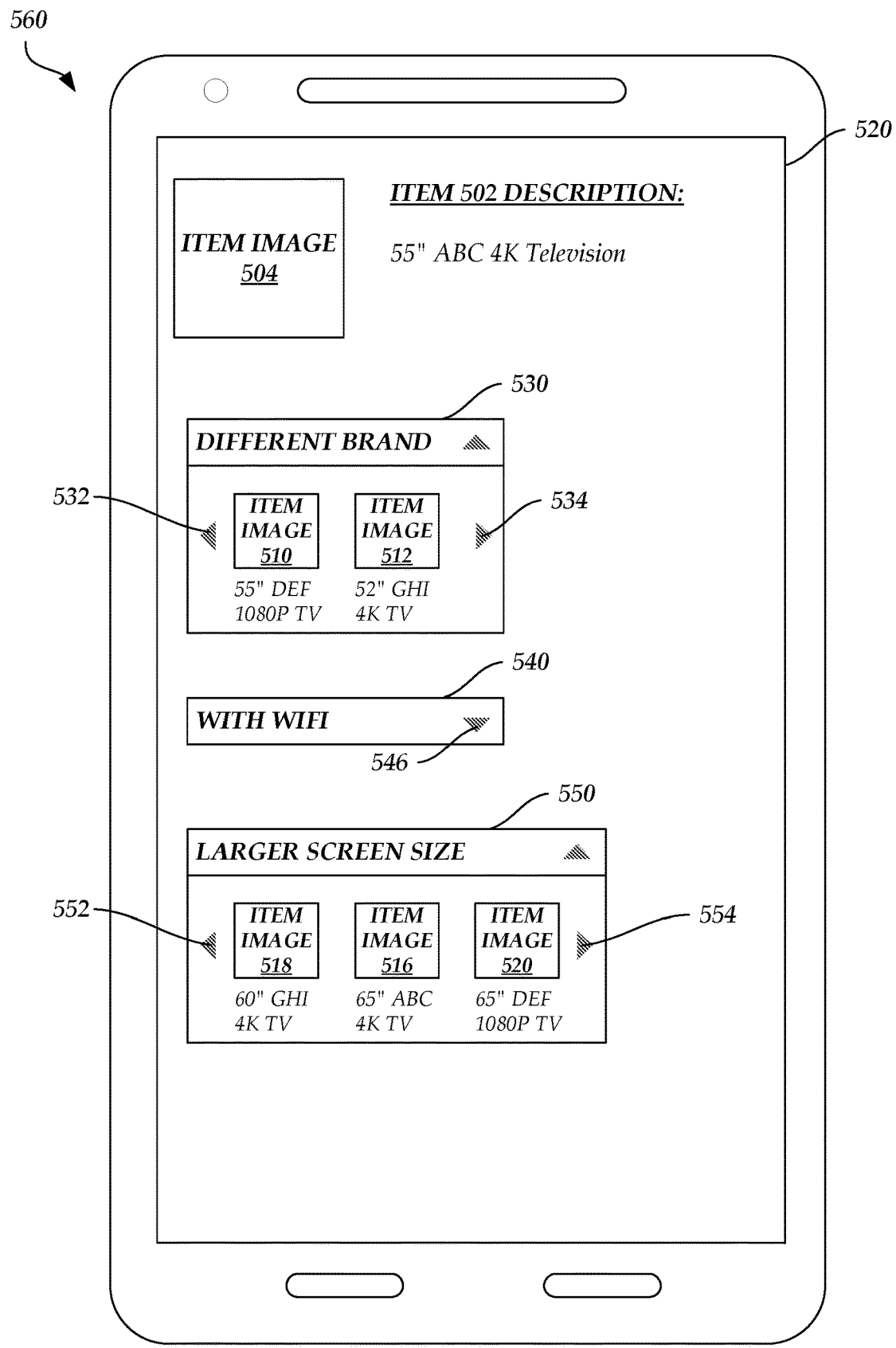

FIGS. 5A-5B illustrate example user interfaces 500 and 560 depicting a content page that is displayed in a browser application 520 running on a user device, such as the user device 102 of FIG. 1. For example, FIG. 5A illustrates the user interface 500 displayed in the browser application 520 running on a laptop or desktop, whereas FIG. 5B illustrates the user interface 560 displayed in the browser application 520 running on a mobile device (e.g., tablet, cell phone, etc.). The user interface data that, when rendered, causes the user device 102 to display the user interfaces 500 and/or 560 may have been generated by the user interface generator 146.

As illustrated in FIG. 5A, the content page is for an item 502 (e.g., the seed item). The user interface 500 includes an item 502 description as well as an image 504 of the item 502. Below the item 502 description and image 504 are various carousel display objects 530, 540, and 550 that correspond to various groups. Such carousel display objects 530, 540, and/or 550 may each be displayed in a different window, container, table, frame, etc. than the item 502 description and the image 504. For example, the item 502 may be a 55" 4K television manufactured by ABC. The item recommender 130 may have determined that various items should be recommended to the user that has selected the item 502 for viewing. In response, the recommendation system 104 (e.g., the group generator 142 and/or the group ranker 144) created a plurality of groups, generated labels for these groups, populated these groups with one or more related items, and ordered the groups based on group relevance. Here, the recommendation system 104 has determined that a group with the label "Different Brand" and corresponding to the carousel display object 530 should be ranked and presented in the user interface 500 first, a group with the label "With WIFI" and corresponding to the carousel display object 540 should be ranked and presented in the user interface 500 second, and a group with the label "Larger Screen Size" and corresponding to the carousel display object 550 should be ranked and presented in the user interface 500 third. The recommendation system 104 may have generated and populated other groups, but such groups may have been ranked lower and therefore do not correspond to any carousel display object included in the user interface 500.

An item with an item image 510 (e.g., a 55" 1080p television manufactured by DEF) and an item with an item image 512 (e.g., a 52" 4K television manufactured by GHI) have been assigned to the group corresponding to the carousel display object 530 and are displayed (e.g., because such items have the highest likelihood of being selected and/or obtained by the user). Other items may be assigned to the group corresponding to the carousel display object 530 and can be viewed by selecting left browse arrow button 532 and/or right browse arrow button 534 (e.g., the items assigned to the group 530 are displayed in a carousel view). Images, descriptions, ratings, etc. of the other items assigned to the group corresponding to the carousel display object 530 may initially be included in the content page (e.g., in the user interface data) in hidden form such that this data need not be retrieved from the items data store 150 or another external source as the user uses the left browse arrow button 532 and/or the right browse arrow button 534 to navigate. Selection of any of these items may cause the user interface 500 to display a content page for the selected item (along with any related items corresponding to the selected item, grouped by the various attributes of the related items). Such items have been assigned to the group corresponding to the carousel display object 530 because while certain attribute values differ or are similar to the attribute values of the item 502, each of the items assigned to the group corresponding to the carousel display object 530 are manufactured by a different brand (e.g., DEF, GHI) than the brand that manufactured the item 502 (e.g., ABC).

An item with an item image 514 (e.g., a 42" 4K television manufactured by DEF) and an item with an item image 516 (e.g., a 65" 4K television manufactured by ABC) have been assigned to the group corresponding to the carousel display object 540 and are displayed (e.g., because such items have the highest likelihood of being selected and/or obtained by the user). Other items may be assigned to the group corresponding to the carousel display object 540 and can be viewed by selecting left browse arrow button 542 and/or right browse arrow button 544 (e.g., the items assigned to the group 540 are displayed in a carousel view). Images, descriptions, ratings, etc. of the other items assigned to the group corresponding to the carousel display object 540 may initially be included in the content page (e.g., in the user interface data) in hidden form such that this data need not be retrieved from the items data store 150 or another external source as the user uses the left browse arrow button 542 and/or the right browse arrow button 544 to navigate. Selection of any of these items may cause the user interface 500 to display a content page for the selected item (along with any related items corresponding to the selected item, grouped by the various attributes of the related items). Such items have been assigned to the group corresponding to the carousel display object 540 because while certain attribute values differ or are similar to the attribute values of the item 502, each of the items assigned to the group corresponding to the carousel display object 540 include WIFI.

Similar to the group corresponding to the carousel display object 530 and the group corresponding to the carousel display object 540, the items assigned to the group corresponding to the carousel display object 550 are displayed in a carousel view (which is a carousel view independent of the carousel view present in the carousel display object 530). For example, an item with an item image 518 (e.g., a 60" 4K television manufactured by GHI), an item with the item image 516 (e.g., a 65" 4K television manufactured by ABC), and an item with an item image 520 (e.g., a 65" DEF 1080p television manufactured by DEF) have been assigned to the group corresponding to the carousel display object 550 and are displayed (e.g., because such items have the highest likelihood of being selected and/or obtained by the user). Other items may be assigned to the group corresponding to the carousel display object 550 and can be viewed by selecting left browse arrow button 552 and/or right browse arrow button 554. Images, descriptions, ratings, etc. of the other items assigned to the group corresponding to the carousel display object 550 may initially be included in the content page (e.g., in the user interface data) in hidden form such that this data need not be retrieved from the items data store 150 or another external source as the user uses the left browse arrow button 552 and/or the right browse arrow button 554 to navigate. Selection of any of these items may cause the user interface 500 to display a content page for the selected item (along with any related items corresponding to the selected item, grouped by the various attributes of the related items). Such items have been assigned to the group corresponding to the carousel display object 550 because while certain attribute values differ or are similar to the attribute values of the item 502, each of the items assigned to the group corresponding to the carousel display object 550 have a larger screen size (e.g., 62", 65") than the screen size of the item 502 (e.g., 55").

Selection of any of arrows 532, 534, 542, 544, 552, and/or 554 can be detected by the network-accessible system 120 and forwarded to the rankings updater 148 such that more relevant groups and/or related items are displayed to the user in the future. In particular, detection of a browse arrow selection may indicate that a user is interested in or finds important an attribute corresponding to the carousel display object 530, 540, 550 that includes the selected browse arrow and/or may indicate that a user is not interested in or does not find important an attribute corresponding to the carousel display object(s) 530, 540, 550 that does not include the selected browse arrow. For example, if a user selects right browse arrow button 542 (e.g., to view additional items assigned to the group corresponding to the carousel display object 540), then the network-accessible system 120 may detect this selection and create detection or feedback data indicating that the selection was made. The rankings updater 148 may receive this feedback data, and use the feedback data to optionally improve an attribute importance value associated with the WIFI attribute.

As illustrated in FIG. 5B, the carousel display objects 530, 540, and/or 550 are expandable and/or collapsible. For example, selection of arrow 546 can cause the carousel display object 540 to collapse (if in an expanded position) or to expand (if in a collapsed position). The carousel display objects 530, 540, and/or 550 may initially be expanded when the user interface 560 is rendered and displayed. The items assigned to the group corresponding to the carousel display object 540 are not visible, however, because the carousel display object 540 has been collapsed by the user via the selection of arrow 542. The user may have collapsed the carousel display object 540 because whether a television has or does not have WIFI is unimportant to the user. The network-accessible system 120 can detect that the user collapsed the carousel display object 540, and forward this information to the rankings updater 148 such that more relevant groups and/or related items are displayed to the user in the future.

In some embodiments, the user may not interact with the carousel display object 530 even though the carousel display object 530 is not collapsed, the user may not interact with the carousel display object 530 but interact with the carousel display object 550, or the user may interact with the carousel display object 530 only after interacting with the carousel display object 550. This interaction can be detected by the network-accessible system 120 and forwarded to the rankings updater 148. If the user does not interact with the carousel display object 530, then the rankings updater 148 may reduce the attribute importance value of the attribute associated with the group corresponding to the carousel display object 530. If the user does not interact with the carousel display object 530 and interacts with the carousel display object 550, then the rankings updater 148 may reduce the attribute importance value of the attribute associated with the group corresponding to the carousel display object 530 and increase the attribute importance value of the attribute associated with the group corresponding to the carousel display object 550. If the user interacts with the carousel display object 530 only after interacting with the carousel display object 550, then the rankings updater 148 may adjust the attribute importance values of the attribute associated with the group corresponding to the carousel display object 530 and the attribute associated with the group corresponding to the carousel display object 550 such that the attribute importance value of the attribute associated with the group corresponding to the carousel display object 550 is higher than the attribute importance value of attribute associated with the the group corresponding to the carousel display object 530.

While the user interface 500 is illustrated as being directed to a television or other like items, this is not meant to be limiting. Similar techniques can be used to identify related videos, to identify related music, to identify related restaurants, to identify related books, and/or to identify any other type of related content in which at least one attribute and/or attribute value is available (e.g., in the case of videos or music, duration, genre, artist, album, title, actor, producer, director, tracks, release date, etc.). A modified version of the user interface 500 can therefore display related videos, related music, etc. in various groups with labels that identify the types of related items assigned therein (e.g., "Different Genre," "Different Artist," "Same Director," "Same Release Date," etc.).

The user interfaces and methods described herein with respect to the recommendation system 104 may also be used to organize the display of recommended items that are selected based on a seed group of items. For example, during a browsing session, a user may view multiple items within a given low-level product category, such as "flat screen TVs." These viewed items may be used as a seed group of items to generate a set of recommended items to present during the browsing session; these session-based recommendations may be generated using, e.g., the methods described in U.S. Pat. No. 7,685,074 (see, e.g., FIG. 11). The methods disclosed herein may then be used to group these recommended items into groups that are dependent upon the attributes of the viewed (seed) items. For instance, the recommended items may be presented in groups such as "flat screen TVs of different screen sizes from those you viewed," "flat screen TVs from other manufactures from those viewed," "flat screen TVs having video features not included in the TVs you viewed," and/or "less expensive flat screen TVs similar to those you viewed."

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method, comprising, by a server system comprising one or more computing devices:
by a group generator component of the server system:
receiving a list of related catalog items that are related to a seed catalog item, the list generated by an item recommender;
determining, based at least partly on attributes of the seed catalog item, a plurality of groups for arranging the related catalog items for display, each group defined by a respective attribute difference relative to the seed catalog item;
generating, for each group, a respective label that identifies the respective attribute difference relative to the seed catalog item; and
assigning at least some of the related catalog items to corresponding groups of the plurality of groups based on determinations of whether the related catalog items possess the respective attribute differences of the groups;
generating, by a user interface generator component of the server system, an interactive catalog page for the seed catalog item, the interactive catalog page comprising a representation of the seed catalog item and comprising multiple carousel display objects, each carousel display object corresponding to a different respective group and comprising a navigation control for scrolling through representations of the related catalog items assigned to the respective group, wherein the interactive catalog page, when displayed on a user device, displays each carousel display object with the label for the corresponding group, whereby related catalog items are arranged for display based on how they differ from the seed catalog item; and
transmitting the interactive catalog page to the user device for display.

2. The computer-implemented method of claim 1, wherein the plurality of groups comprise a first group that corresponds to a numerical attribute for which the seed catalog item has a first value, and the first group consists of related catalog items having a value for the numeric attribute that exceeds the first value.

3. The computer-implemented method of claim 1, wherein the plurality of groups comprise a first group that corresponds to a textual attribute for which the seed catalog item has a first value, and the first group consists of related catalog items whose value for the textual attribute differs from the first value.

4. The computer-implemented method of claim 1, wherein the plurality of groups comprise a first group that corresponds to a binary attribute for which the seed catalog item has a binary value indicating that a particular feature is not present, and the first group consists of related catalog items that include the particular feature.

5. The computer-implemented method of claim 1, wherein generating a respective label for each group comprises, for a first group corresponding to a first item attribute of a first attribute type, selecting a label template that corresponds to the first attribute type, and using the label template and a name of the first item attribute to generate the label for the first group.

6. The computer-implemented method of claim 1, wherein each carousel display object additionally includes a user-selectable control for collapsing a display of the respective carousel display object on the interactive catalog page.

7. The computer-implemented method of claim 1, further comprising:
determining an additional group that corresponds to a first attribute for which the seed item has a first value, said additional group defined to consist of related catalog items that also have said first value for said first attribute;
generating a label for the additional group, said label specifying that members of the additional group have said first value for the first attribute; and
incorporating into the interactive catalog page a carousel display object corresponding to the additional group.

8. The computer-implemented method of claim 1, further comprising:
receiving, for each related catalog item in the list, a respective relevance score generated by the item recommender; and
ranking the plurality of groups for display on the interactive catalog page based at least partly on the relevance scores of the related catalog items assigned to the respective groups.

9. The computer-implemented method of claim 1, wherein the user device is a smartphone.

10. A server system comprising one or more computing devices, the server system programmed with executable instructions to implement at least:
a group generator configured to:
receive a list of related catalog items that are related to a seed catalog item, the list generated by an item recommender system;
determine, based at least partly on attributes of the seed catalog item, a plurality of groups for arranging the related catalog items for display, each group defined by a respective attribute difference relative to the seed catalog item;
generate, for each group, a respective label that identifies the respective attribute difference relative to the seed catalog item; and
assign at least some of the related catalog items to corresponding groups of the plurality of groups based on determinations of whether the related catalog items possess the respective attribute differences of the groups; and
a user interface generator configured to generate an interactive catalog page for the seed catalog item, the interactive catalog page comprising a representation of the seed catalog item and comprising multiple carousel display objects, each carousel display object corresponding to a different respective group and comprising a navigation control for navigating representations of the related catalog items assigned to the respective group;
wherein the server system is configured to transmit the interactive catalog page to a user device for display;
wherein the interactive catalog page, when displayed on the user device, is configured to display each carousel display object with the label for the corresponding group, whereby related catalog items are arranged for display based on how they differ from the seed catalog item.

11. The server system of claim 10, wherein the plurality of groups comprise a first group that corresponds to a numerical attribute for which the seed catalog item has a first value, and the first group consists of related catalog items having a value for the numeric attribute that exceeds the first value.

12. The server system of claim 10, wherein the plurality of groups comprise a first group that corresponds to a textual attribute for which the seed catalog item has a first value, and the first group consists of related catalog items whose value for the textual attribute differs from the first value.

13. The server system of claim 10, wherein the plurality of groups comprise a first group that corresponds to a binary attribute for which the seed catalog item has a binary value indicating that a particular feature is not present, and the first group consists of related catalog items that include the particular feature.

14. The server system of claim 10, wherein the group generator is configured to generate the respective label for a first group corresponding to a first item attribute of a first attribute type by a process that comprises:
    selecting a label template that corresponds to the first attribute type; and
    using the label template and a name of the first item attribute to generate the label for the first group.

15. The server system of claim 10, wherein each carousel display object additionally includes a user-selectable control for collapsing a display of the respective carousel display object on the interactive catalog page.

16. The server system of claim 10, wherein the group generator is additionally configured to:
    determine an additional group that corresponds to a first attribute for which the seed item has a first value, said additional group defined to consist of related catalog items that also have said first value for said first attribute; and
    generate a label for the additional group, said label specifying that members of the additional group have said first value for the first attribute;
    wherein the user interface generator is configured to incorporate into the interactive catalog page a carousel display object corresponding to the additional group.

17. The server system of claim 10, wherein the server system is further programmed to implement a group ranker that is configured to:
    receive, for each related catalog item in the list, a respective relevance score generated by the item recommender system; and
    rank the plurality of groups for display on the interactive catalog page based at least partly on the relevance scores of the related catalog items assigned to the respective groups.

* * * * *